No. 752,958. PATENTED FEB. 23, 1904.
J. M. CONROY.
SUPPORT FOR MIRRORS.
APPLICATION FILED SEPT. 16, 1903.
NO MODEL.
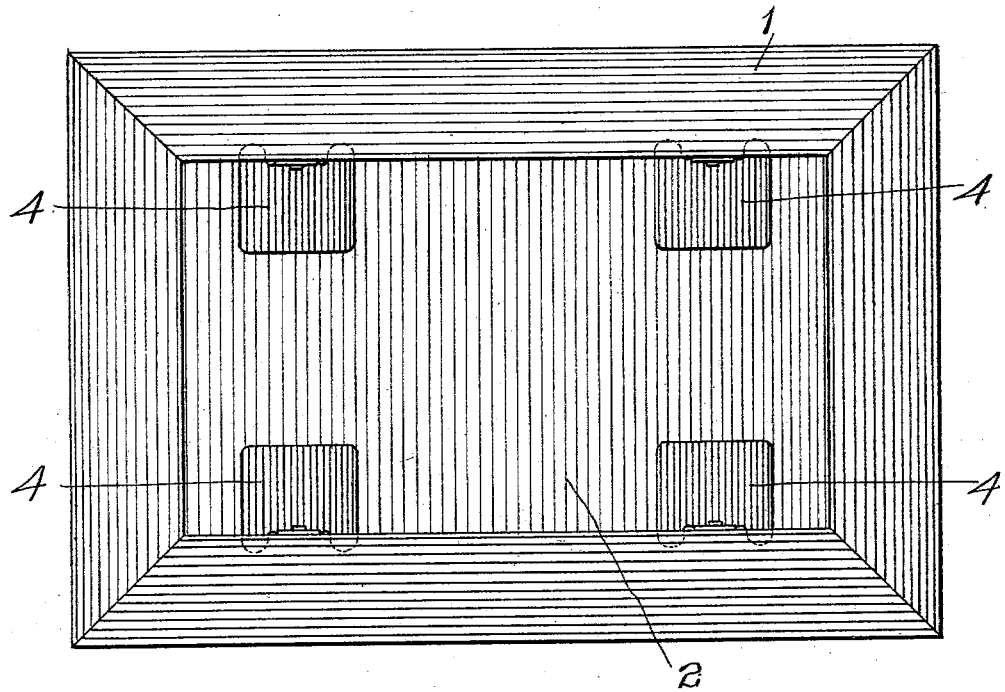
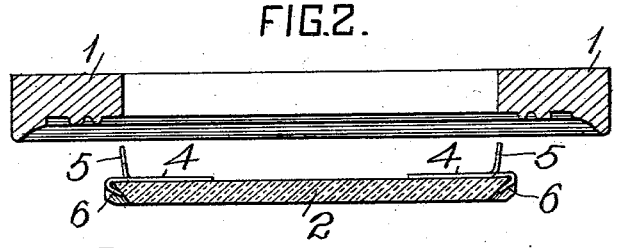
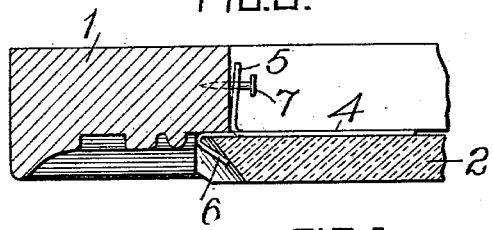
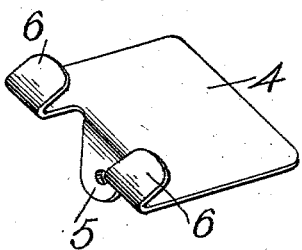
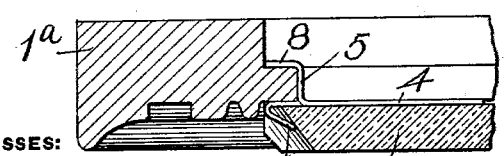
WITNESSES:
Herbert Bradley
Fred Kirchner
INVENTOR
John Marcellus Conroy
by Christy and Christy
Attys.

No. 752,958.

Patented February 23, 1904.

UNITED STATES PATENT OFFICE.

JOHN MARCELLUS CONROY, OF ALLEGHENY, PENNSYLVANIA.

SUPPORT FOR MIRRORS.

SPECIFICATION forming part of Letters Patent No. 752,958, dated February 23, 1904.

Application filed September 16, 1903. Serial No. 173,404. (No model.)

*To all whom it may concern:*

Be it known that I, JOHN MARCELLUS CONROY, a citizen of the United States, residing at Allegheny, in the county of Allegheny and State of Pennsylvania, have invented or discovered certain new and useful Improvements in Supports for Mirrors, of which improvements the following is a specification.

My invention relates to supports for mirrors; and the object of my invention is to provide a simple and effective means of securing a mirror within a frame adapted to receive it.

In the accompanying drawings, which form part of this specification, Figure 1 is a view in elevation of the back of a mirror secured in a frame according to my present invention. Fig. 2 is a view in transverse section of the frame and mirror detached, the clips being shown applied to the mirror in position for assembling. Fig. 3 is a view in transverse section and on larger scale further illustrating the securing of the mirror within the frame. Fig. 4 is a similar view showing another means of securing the parts. Fig. 5 is a view in perspective of the clip by means of which the engagement between mirror and frame is made.

Parts which are repeated in the several figures of the drawings bear the same reference-numerals in each case.

As illustrated in the drawings, 1 indicates the frame, and 2 the mirror secured therein. In Letters Patent No. 733,162, granted me July 7, 1903, for reissue of which I have made application, (September 3, 1903, Serial No. 171,835,) I have shown and described a clip for securing a mirror in its support. The application of this clip to secure a mirror within a frame constitutes my present invention. The clip shown in perspective in Fig. 5 is formed of resilient material. It consists of a body portion 4, upon which are formed forward-extending and backward-extending lugs 6 and 5. The backward-extending lug 5 protrudes from the body portion at such an angle as to lie adjacent to the frame when the parts are assembled in the manner presently to be described. This in my preferred construction approximates a right angle. The forward-extending lug or lugs—there are preferably two of them—extend from the body portion at such an angle that when the clips are applied to the edge of a mirror and the backward-extending lugs brought within the mirror's frame in the manner presently to be described the clips will be compressed upon the mirror's edge and the forward-extending lugs forced outward from the body portion.

The invention while not limited to is particularly applicable to mirrors having beveled edges, and when designed for such mirrors it is desirable that the forward-extending lugs form an angle with the body portion of the clips normally more acute than the angle of the bevel of the edge of the mirror. These clips are preferably stamped from sheet-steel in blank and the lugs subsequently bent to the desired positions.

The relative sizes of the mirror and the frame are preferably (though not necessarily) such as the drawings indicate, the mirror lapping slightly upon the face of the frame.

The assembling of the parts as illustrated in Figs. 2 and 3 is made thus: Clips are placed upon opposite edges of the mirror, their body portions lying upon its posterior surface, their forward-extending lugs in consequence of their inclination contacting with the edge of the mirror only at or near their free ends. The backward-extending lugs protrude from the back of the mirror, and the transverse distance between these backward-extending lugs is slightly greater than the transverse distance between suitably-formed surfaces in the frame. This is illustrated in Fig. 2. The oppositely-placed clips are then forced toward one another and the frame applied so that the backward-extending lugs lie within and rest against the surfaces of the frame formed to receive them. This is indicated in Fig. 3. When the parts are thus assembled, the forward-extending lugs have been forced outward to some extent, and the resilience of the material causes them to grip the edges of the mirror firmly and at the same time causes the backward-extending lugs to make binding contact with the surfaces of the frame against which they rest. As shown in Fig. 1, two pairs of oppositely-placed clips are employed upon two opposite edges of the mirror. Any desired number may be employed, and they may, if desired, be applied to the ends as well as to the sides of the mirror.

Additional features in securing the parts are illustrated in Figs. 3 and 4. These features are, however, not essential to my invention in its broadest scope. As indicated in Fig. 3, the backward-extending lug binds at its base, while its free end diverges somewhat from the surface of the edge of the frame. By driving a brad 7 through the free end of this lug and into the frame the lug is drawn down against the surface of the frame. The advantage of thus securing the clip is twofold. In the first place it prevents the lug from slipping in the frame and causing displacement of the mirror, and, secondly, the driving of the free end of lug 5 outward against the frame exerts a leverage upon the forward-extending lugs 6, causing their free ends to advance upon the edges of the mirror, and thus increasing their resilient grip upon these edges. In Fig. 4 is shown a modification in the assembling of the parts. The inner edge of the frame 1ᵃ instead of being a plane surface perpendicular to the general plane of the whole, as in Fig. 3, is recessed, as at 8, so that the rearward-extending lug 5 may when the parts are assembled be bent outward to engage the surface of the recess. In so doing the binding force of the forward-extending clips upon the mirror's edge is increased, the effect being similar to the effect of driving the brad in the form shown in Fig. 3. The specific form of frame shown in Fig. 4 is the picture-molding of trade, and has therefore the advantage of cheapness; but for this the shape of the recess is immaterial.

This invention I have found particularly applicable to mirrors having "chipped bevel" edges, and the drawings indicate such an application. When so applied, the plurality of forward-extending lugs are so spaced as to rest within adjacent concavities in the mirror's beveled edge, and thus a mirror held within a frame by laterally-placed clips is secured against longitudinal displacement in its frame.

I claim as my invention—

1. The combination with a mirror and a frame therefor, of resilient clips engaging opposite edges of the mirror and the frame, each clip consisting of a body portion engaging the back of the mirror, a lug extending forward from the body portion and engaging the edge of the mirror and a lug extending backward from the body portion and engaging the frame, substantially as described.

2. The combination with a mirror having a beveled edge and a frame therefor, of resilient clips, each clip consisting of a body portion, a lug extending rearward from the body portion, and a lug extending forward from the body portion at an angle normally more acute than the angle of the bevel of the mirror's edge, substantially as described.

3. The combination with a mirror and a frame therefor, of a resilient clip consisting of a body portion, a lug extending forward from the body portion and contacting with the edge of the mirror, and a lug extending rearward from the body portion adjacent to the inner edge of the frame and normally diverging therefrom, together with means for securing the rearward-extending lug to the frame, substantially as described.

4. The combination with a mirror having a chipped bevel edge and a frame therefor, of resilient clips, each clip consisting of a body portion, a lug extending rearward from the body portion and adapted to engage the frame, and a plurality of lugs extending forward from the body portion and adapted to engage the mirror's edge, substantially as described.

5. The combination with a mirror, a frame, and resilient clips engaging opposite edges of the mirror and the frame, each of the said clips having a body portion engaging the back of the mirror, a forward-extending lug engaging the mirror's edge, and a backward-extending lug engaging the frame; and the said frame provided with recesses which the rearward-extending lugs of the clips engage, substantially as described.

In testimony whereof I have hereunto set my hand.

JOHN MARCELLUS CONROY.

Witnesses:
ROLAND K. ANDRUS,
BAYARD H. CHRISTY.